United States Patent [19]

Fechner et al.

[11] Patent Number: 4,490,176
[45] Date of Patent: Dec. 25, 1984

[54] FLUID, STABLE FORMULATIONS

[75] Inventors: Wolf D. Fechner, Dirmstein; Joachim Kranz, Ludwigshafen; Rudolf Polster, Frankenthal, all of Fed. Rep. of Germany

[73] Assignee: BASF Aktiengesellschaft, Ludwigshafen, Fed. Rep. of Germany

[21] Appl. No.: 429,232

[22] Filed: Sep. 30, 1982

[30] Foreign Application Priority Data

Oct. 13, 1981 [DE] Fed. Rep. of Germany ....... 3140519

[51] Int. Cl.$^3$ ............................................. C09D 11/00
[52] U.S. Cl. ................................ 106/23; 106/308 N; 106/308 Q
[58] Field of Search ................. 106/23, 308 N, 308 S, 106/308 Q; 260/DIG. 38; 524/431

[56] References Cited

U.S. PATENT DOCUMENTS

| | | | |
|---|---|---|---|
| 3,721,635 | 3/1973 | Fellows et al. | 524/431 |
| 3,980,602 | 9/1976 | Jakubauskas | 524/431 |
| 3,996,179 | 12/1976 | Haus et al. | 106/23 |
| 4,013,599 | 3/1977 | Strauss et al. | 524/431 |
| 4,017,448 | 4/1977 | Panush | 524/431 |
| 4,244,863 | 1/1981 | Hemmerich | 524/431 |
| 4,369,070 | 1/1983 | Aign et al. | 106/308 N |

Primary Examiner—Paul Lieberman
Assistant Examiner—Amelia B. Yarbrough
Attorney, Agent, or Firm—Oblon, Fisher, Spivak, McClelland & Maier

[57] ABSTRACT

Stable, fluid formulations contain (a) finely divided iron cyano complexes, iron-III oxides or iron-III oxide hydrates, (b) one or more $C_6$–$C_{18}$-alkylbenzenesulfonic acid, (c) one or more compounds which are obtained by Mannich condensation from 2-hydroxynaphthalene, which may or may not contain 1 or 2 additional β-hydroxyl groups, formaldehyde and primary or secondary aliphatic, cycloaliphatic or aromatic monoamines, diamines, triamines or polyamines or 5- or 6-membered heterocyclic compounds, and which contain from 1 to 6 β-hydroxynaphthyl groups, and (d) one or more organic liquids, the ratio of (b):(c) being from 1:8 to 2:1 and the amount of (c) being from 10 to 20% by weight, based on (a).

The formulations are fluid or pourable at pigment concentrations of from 20 to 55% by weight and give very deeply colored, very glossy finishes.

15 Claims, No Drawings

FLUID, STABLE FORMULATIONS

The present invention relates to novel fluid, stable formulations.

The production of printing inks and paints frequently entails the preparation and use of pigment formulations in solvents or binder solutions which are compatible with the printing inks and/or paints. To obtain formulations of high color strength, the pigments must be very finely divided. This however has the disadvantage that the formulations are as a rule no longer pourable at pigment contents of as low as about 10% by weight.

Since, on the other hand, very concentrated formulations must be used in order not to impose restrictions on the choice of binders and solvents in the preparation of the paints or inks, the pigment formulations are as a rule employed in the form of relatively concentrated pastes. For industrial use, it would be very advantageous if 20-40% strength by weight formulations of finely divided pigments in organic liquids were to have a pourable or fluid consistency.

It is an object of the present invention to provide fluid, stable, binder-free pigment formulations which contain the pigment in a stabilized form, so that no flocculation occurs on dilution.

We have found that this object is achieved when the formulations contain (a) a finely divided pigment based on iron cyano complexes, iron-III oxide or iron-III oxide hydrate, (b) one or more $C_6$–$C_{18}$-alkylbenzenesulfonic acids, (c) one or more compounds which are obtained by Mannich condensation from 2-hydroxynaphthalene, which may or may not contain 1 or 2 additional β-hydroxyl groups, formaldehyde and primary or secondary aliphatic, cycloaliphatic or aromatic monoamines, diamines, triamines or polyamines or 5-membered or 6-membered heterocyclic compounds possessing an NH group as a ring member, and which contain from 1 to 6 hydroxynaphthyl groups, and (d) one or more organic liquids, with or without (e) other assistants conventionally used in pigment formulations, the weight ratio of (b):(c) being from 1:8 to 2:1 and the amount of (c) being from 10 to 20% by weight, based on (a).

Using the formulations according to the invention, paints are obtained which exhibit substantially improved properties compared to the prior art. The paints give very deeply colored, very glossy coatings. The pigments exhibit very good rub-out characteristics, and high color strength coupled with great brilliance. The novel formulations are compatible with very diverse, for example oven-drying or air-drying, binder systems and accordingly can be employed universally.

The novel fluid formulations can be incorporated into the binder systems by simple stirring-in, and this does not cause flocculation of the pigment.

Compared to the corresponding prior art formulations, which do not contain components (b) and (c), the formulations according to the present invention exhibit markedly lower viscosity. Moreover, the paints prepared using the novel formulations have improved color strength.

Suitable pigments (a) for the novel formulations are finely divided pigments based on iron cyano complexes, iron-III oxide and iron-III oxide hydrate. The particle size of the pigments used is less than 0.5 μm and preferably less than 0.1 μm.

Examples of suitable iron cyano complexes are those known as C.I. Pigment Blue, C.I. No. 77,510, such as iron blue, Prussian blue, steel blue and Milori blue, amongst which Milori blue is preferred.

The preparation of the finely divided pigments contained in the formulations is known.

Components (b) are $C_8$–$C_{18}$-alkylbenzenesulfonic acids, where alkyl is linear or branched. Specific examples are 4-octylbenzenesulfonic acid, 4-nonylsulfonic acid, 4-decylbenzenesulfonic acid, 4-dodecylbenzenesulfonic acid, 4-tetradecylbenzenesulfonic acid, 4-hexadecylbenzenesulfonic acid, 4-octadecylbenzenesulfonic acid or mixtures of these acids, dodecylbenzenesulfonic acid being preferred.

An essential constituent of the novel formulations is component (c) which is obtained by Mannich condensation of 2-hydroxynaphthalene, which may or may not possess 1 or 2 additional β-hydroxyl groups, formaldehyde and primary or secondary aliphatic, cycloaliphatic or aromatic monoamines, diamines, triamines or polyamines or 5-membered or 6-membered heterocyclic groups possessing NH— groups, the condensation product containing from 1 to 6 β-hydroxynaphthyl groups.

Suitable 2-hydroxynaphthalenes for the preparation of (c) are 2-hydroxynaphthalene, 2,7-dihydroxynaphthalene and 2,3-dihydroxynaphthalene. The condensates based on the first two of these are preferred.

Examples of primary and secondary amines suitable for the preparation of (c) are primary and secondary, aliphatic and cycloaliphatic monoamines, $C_2$- and $C_3$-alkylenediamines, di-$C_2$- and di-$C_3$-alkylenetriamines, tri-$C_2$- and tri-$C_3$-alkylenetetramines and poly-($C_2$- and $C_3$-alkylene)-polyamines, cycloaliphatic diamines, aromatic diamines and 5-membered or 6-membered saturated or unsaturated heterocyclic compounds containing an NH group as a ring member.

Compounds (c) are known or are prepared in a known manner (Houben-Weyl, Methoden der organischen Chemie, 4th edition (1957), Volume XI, pages 731 et seq., Georg Thieme Verlag, Stuttgart).

Preferred compounds (c) are those of the general formula $$R^3—CH_2—X \qquad (I)$$

where $R^3$ is 2-hydroxynaphth-1-yl, which may or may not contain 1 or 2 additional β-hydroxyl groups, or is

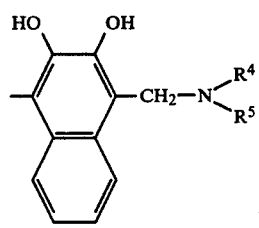

and

X is a radical of the formula

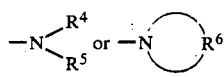

where
R[4] and R[5] are each an aliphatic or phenylaliphatic radical, and may be identical or different, or
R[5] is a group of the formula —CH$_2$—R[3] and
R[4] is a group of the formula

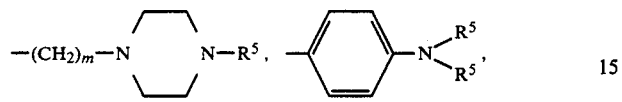

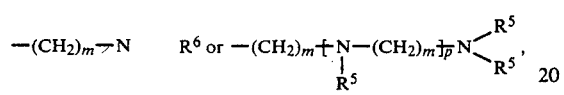

m is 2 or 3,
p is 0, 1 or 2,

is a saturated or unsaturated 5-membered or 6-membered heterocyclic ring which may or may not contain —O— or

as additional ring members and/or may or may not contain one or two

groups, and
R[7] is C$_1$–C$_4$-alkyl.

Examples of aliphatic and phenylaliphatic radicals R[4] and R[5] are:
1. C$_1$–C$_5$-alkyl, eg. methyl, ethyl, propyl, n- and iso-butyl and pentyl.
2. C$_1$–C$_8$-alkoxy-C$_2$- and -C$_3$-alkyl, eg. 2-methoxyethyl, 3-methoxypropyl, 2-ethoxyethyl, 3-ethoxypropyl, 2-n- and i-propoxyethyl, 3-n- and i-propoxypropyl, 2-n-butoxyethyl, 3-n-butoxypropyl, 2-(2'-ethylhexoxy)-ethyl and 3-(2'-ethylhexoxy)-propyl.
3. Alkoxy-alkoxy-C$_2$- and -C$_3$-alkyl, where alkoxyalkoxy is of 3 to 11 carbon atoms, eg. 2'-methoxy-2-ethoxyethyl, 2'-methoxy-3-ethoxypropyl, 3'-methoxy-3-propoxypropyl, 2'-ethoxy-2-ethoxyethyl, 2'-ethoxy-3-ethoxypropyl, 3'-ethoxy-3-propoxypropyl, 2'-propoxy-2-ethoxyethyl, 2'-propoxy-3-ethoxypropyl, 3'-propoxy-3-propoxypropyl, 2'-butoxy-2-ethoxyethyl, 2'-butoxy-3-ethoxypropyl, 3'-butoxy-3-propoxypropyl and 3'-(2''-ethylhexoxy)-3-propoxypropyl.
4. Hydroxy-C$_2$-C$_3$-alkyl, eg. 2-hydroxyethyl and 2- and 3-hydroxypropyl.
5. N,N-Di-C$_1$–C$_4$-alkylamino-C$_2$- and -C$_3$-alkyl, eg. 2-(N,N-dimethylamino)-ethyl, 3-(N,N-dimethylamino)-propyl, 2-(N,N-diethylamino)-ethyl, 2-(N,N-dibutylamino)-ethyl, 3-(N,N-diethylamino)-propyl and 3-(N,N-dibutylamino)-propyl.
6. Phenyl-C$_1$-C$_4$-alkyl, eg. benzyl, 2-phenylethyl and 2- and 3-phenylpropyl.
7.

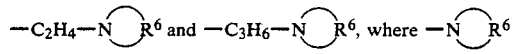

is a 5-membered or 6-membered saturated or unsaturated heterocyclic ring which may or may not contain —O— or

as additional ring members and/or one or two

groups, and R[7] is C$_1$–C$_4$-alkyl.

Examples of suitable heterocyclic radicals

are those derived from morpholine, piperidine, pyrrolidone, pyrrolidine, pyrazole, N'-C$_1$-C$_4$-alkylpiperazine or phthalimide.

Preferred compounds of the formula (I) are those where R[3] is 2,7-dihydroxynaphth-1-yl or 2-hydroxynaphth-1-yl.

In turn, more especially preferred compounds from amongst these are those where R[3] and R[4] have the meanings given above under 1 to 7. Further especially preferred compounds of the formula I are those where R[3] is 2-hydroxynaphth-1-yl or 2,7-dihydroxynaphth-1-yl and X is

where R[5] is —CH$_2$—R[3] and R[4] is a radical of the formula

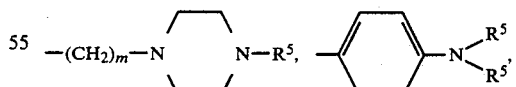

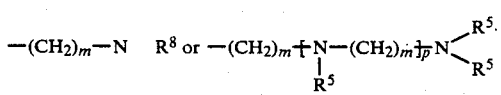

m being 2 or 3, p being 0, 1 or 2 and

being a radical derived from morpholine or piperidine.

For economic reasons, very particularly preferred compounds (c) are those of the formulae (IIa) and (IIb)

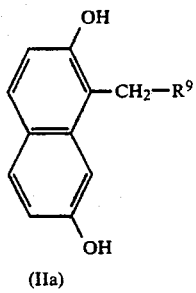  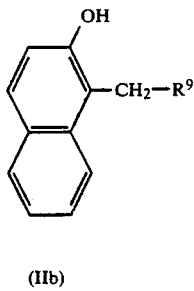

(IIa)  (IIb)

where $R^9$ is N-morpholinyl, N-piperidinyl, N-pyrrolidonyl, N-pyrazolyl, N-phthalimido, N-(N'-methylpyrazinyl) or N-(N'-ethylpyrazinyl), or is di-$C_1$-$C_4$-alkylamino, di-$C_1$-$C_4$-alkoxyethylamino or di-$C_1$-$C_4$-alkoxy-propylamino, eg. dimethylamino, diethylamino, dipropylamino or dibutylamino, di-(2-methoxyethyl)-amino, di-(2-ethoxyethyl)-amino, di-(2-propoxyethyl)-amino, di-(2-butoxyethyl)-amino, di-(3-methoxypropyl)-amino, di-(3-ethoxypropyl)-amino, di-(3-butoxypropyl)-amino, or di-(2-hydroxyethylamino) or dibenzylamino.

Suitable organic liquids (d) for the fluid formulations are those conventionally used for the preparation of paints, for example alkylaromatics, eg. toluene, xylenes, $C_9$-$C_{11}$-alkylbenzenes, esters of ethylene glycol mono-$C_1$-$C_4$-alkyl ethers with $C_2$-$C_4$-alkanoic acids, eg. ethylene glycol monoethyl ether acetate, and mixtures of these liquids.

The formulations of the present invention contain from 10 to 20% by weight of (c), based on (a), the weight ratio of (b):(c) being from 1:8 to 2:1.

The novel formulations may contain, in addition to (a) to (d), other agents (e) conventionally used in fluid pigment formulations, for example agents which reduce or even completely prevent sedimentation of the pigments, corrosion inhibitors, pH stabilizers and the like.

Amongst these agents, it is preferred to use, where necessary, those which reduce or even entirely prevent sedimentation of the pigment. This is particularly advantageous when using pigments based on iron cyano complexes, such as Milori blue.

Examples of sedimentation-preventing agents are di-$C_4$-$C_{18}$-alkyl esters of sulfosuccinic acid, especially the dioctyl ester, in the form of the alkali metal salts or ammonium salts.

The amounts of the agents (e) should be as low as possible and are as a rule up to about 3% by weight, preferably from 0.1 to 3, and especially from 0.3 to 2, % by weight, based on (a).

As a rule the novel fluid formulations contain from 20 to 55% by weight of (a), from 1.0 to 12% by weight of (b), from 2 to 8% by weight of (c) and from 77.0 to 30% by weight of (d), these percentages being based on the sum of (a+b+c+d).

Preferred formulations are those which contain, based on (a+b+c+d), from 25 to 50% by weight of (a), from 1.5 to 10% by weight of (b), from 3 to 7.0% by weight of (c) and from 70.5 to 38% by weight of (d).

The novel formulations are obtained by mixing the components into the desired organic liquid or liquids. Advantageously, the finely divided pigment (a) is introduced into the mixture of (b)+(c) in (d), since the fluid formulation is thus obtained direct. It is however also possible first to introduce (a) into (d). This gives a viscous to firm paste, which becomes liquid on incorporation of (b)+(c). Advantageously, the procedure followed is to introduce (a) into the mixture of (c) and (d), homogenize this mix, and then add (b) as the last ingredient, whereupon the viscous paste becomes fluid.

The Examples which follow illustrate the invention. In these, parts and percentages are by weight. The viscosity of the formulations is recorded in terms of the flow time in seconds from a DIN cup with 6 mm nozzle.

A. Tinctorial tests on the formulations

A1. Preparation of a finish

To assess the tinctorial properties of the pigments contained in the formulations, the latter were used to produce finishes, using 2 different systems, namely:

Finish 1: A baking finish based on alkyd-urea-melamine resin (solvent: xylene/butanol mixture).

Finish 2: A long-oil air-drying alkyd resin (®Alkydal F 681) finish (solvent: universal spirit).

The finishes used to produce the test films were prepared as follows:

1.1 Colored finishes (1) and (2) (pigment content: 10%) were prepared from the formulations by a 2-stage method. In this, the amount of pigment formulation corresponding to 10 g of pigment is diluted—where appropriate after adjustment to 20% pigment content—in 2 stages with the amount of finish 1 or finish 2 shown in the Table below, which also indicates the binder concentration thereof.

| Preparation stage | Pigment formulation* | Colored finish 1 | | Colored finish 2 | |
|---|---|---|---|---|---|
| | | Binder | | Binder | |
| | | g | % | g | % |
| I | 50 | 25 | 21.5 | 25 | 25 |
| II | | 25 | 43 | 25 | 50 |

*20% pigment content

In stage I, the finish is slowly stirred in for 2 minutes, using a blade stirrer. In stage II, the mixture is stirred for 3 minutes at 2,000 rpm.

1.2 Full-shade finishes (1) and (2) (5% of pigment)

25 g of the colored finish (1) or (2) from A 1.1 are mixed homogeneously with 25 g of finish 1 or finish 2, containing 35% of binder.

1.3 White reduction—finish 1

1.3.1

8 g of the full-shade finish 1 from A 1.2 are mixed homogeneously with 20 g of white finish (containing 40% of titanium dioxide).

1.3.2

16 g of the full-shade finish 1 from A 1.2 are mixed homogeneously with 20 g of white finish (containing 40% of titanium dioxide).

1.4 White reduction—finish 2

1.4.1

4 g of full-shade finish 2 (from A 1.2) are mixed homogeneously with 20 g of white finish (containing 20% of titanium dioxide) and 18 drops of hardener.

1.4.2

8 g of full-shade finish 2 (from A 1.2) are mixed homogeneously with 20 g of white finish (containing 20% of titanium dioxide) and 18 drops of hardener.

1.5 Comparative full-shade finishes 1 and 2 (5%) of pigment)

5 g of the comparative pigment and 95 g of finish 1 or finish 2 (35% binder content) are mixed with 100 ml of glass beads (3 mm diameter) and the batch is shaken on a ®RED DEVIL mill for 60 minutes.

The glass beads are removed by sieving.

1.6 White reduction—finish 1 (comparison)

1.6.1

8 g of full-shade finish 1 from A 1.5 are mixed homogeneously with 20 g of white finish (containing 40% of titanium dioxide).

1.6.2.

16 g of full-shade finish 1 from A 1.5 are mixed homogeneously with 20 g of white finish (containing 40% of titanium dioxide).

1.7 White reduction—finish 2 (comparison)

1.7.1

4 g of full-shade finish 2 from A 1.5 are mixed homogeneously with 20 g of white finish (containing 20% of titanium dioxide) and 18 drops of hardener.

1.7.2

8 g of full-shade finish 2 from A 1.5 are mixed homogeneously with 20 g of white finish (containing 20% of titanium dioxide) and 18 drops of hardener.

A2. Color evaluations 2.1 White reduction—finish 1

The finish from A 1.3 or A 1.6 is coated onto board using a 150 μm wire coater and the coating is air-dried for 20 minutes and then baked at 120° C. for 15 minutes.

2.2 White reduction—finish 2

The finish from A 1.4 or A 1.7 is coated onto board using a 150 μm wire coater and is air-dried.

2.3 The white reduction coatings obtained as described in A 2.1 and A 2.2 are evaluated by the CIELAB system (Dr. Fritz Heinrich, defazet 1977, No. 8, pages 318–324) in respect of color strength, hue (H) and purity (C). The color strength was expressed as the color equivalent (CE), taking the coloration obtained with the comparative pigment as 100.

EXAMPLES 1 TO 7

A parts of Milori blue pigment powder (primary particle size 0.1 μm) are introduced into D parts of a mixture of $C_9$–$C_{19}$-alkylbenzenes and ethylene glycol ethyl ether acetate (70:30) and C parts of the compound

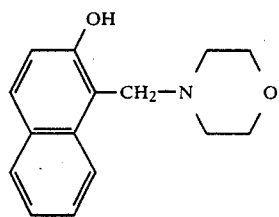

B parts of dodecylbenzenesulfonic acid are then stirred in. The fluid formulation obtained gives very deeply colored, pure-hued brilliant white reductions in both the baking finish and the alkyd finish.

The amounts A, B, C and D employed are shown in Table I, which also lists the viscosities of the formulations (column 6) and the results of the color test (A 2.3), using finish 1 in the white reductions obtained as described in A 1.2, A 1.3.1 and A 2.1, in comparison with the colorations obtained as described in A 1.5, A 1.6.1 and A 2.1.

TABLE I

| | Formulation prepared from | | | | Viscosity of formulation | Test results Finish 1/White reduction | | |
|---|---|---|---|---|---|---|---|---|
| Example | D [parts] | C [parts] | A [parts] | B [parts] | [s] | CE | ΔH | ΔC |
| 1 | 40 | 5 | 50 | 5 | 60 | 98 | 0 | 0 |
| 2 | 45 | 5 | 45 | 5 | 9 | 93 | 0 | +0.1 |
| 3 | 50 | 5 | 40 | 5 | 6 | 95 | +0.1 | −0.2 |
| 4 | 55 | 5 | 35 | 5 | 5 | 96 | +0.1 | −0.3 |
| 5 | 60 | 5 | 30 | 5 | 5 | 93 | +0.1 | −0.3 |
| 6 | 55 | 5 | 30 | 10 | 5 | 96 | +0.1 | +0.3 |
| 7 | 47 | 5 | 45 | 3 | 6 | 90 | −0.3 | +0.3 |
| 8(a) | 48.5 | 5 | 45 | 1.5 | 8 | 89 | −0.6 | +0.4 |
| 8(b) | 51.5 | 2 | 45 | 1.5 | >100 | 93 | −0.2 | +0.1 |
| 8(c) | 47.5 | 5[3] | 45 | 1.5 | 5 | 92 | ±0 | +0.3 |
| 8(d) | 42.5 | 5[3] | 50 | 1.5 | 7 | 92 | −0.3 | +0.4 |
| Comparison II | 80 | 0 | 20 | 0 | (2) | >300 | >−4 | −10 |
| Comparison I[1] | | | | | | 100 | 246.1 H | 32.3 C |

[1] prepared as described in A 1.5, A 1.6.1 and A 2.1
[2] inhomogeneous; pigment settles out
[3] + 1.0 part of the sodium salt of di-n-octyl sulfosuccinate

EXAMPLE 8

(a) 45 parts of Milori blue pigment powder (size of primary particles <0.1 μm) are introduced in 48.5 parts of a mixture of $C_9$–$C_{19}$-alkylbenzenes and ethylene glycol ethyl ether acetate (70:30) and 5 parts of the compound

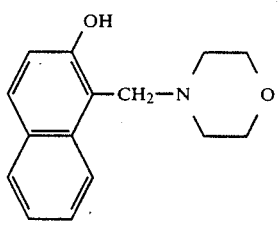

and the mixture is stirred until homogeneous. 1.5 parts of dodecylbenzenesulfonic acid are then added, with stirring. A fluid formulation (cup flow time 8 s) is obtained, which, in a baking finish, gives very deep pure-hued brilliant white reduction colorings. The coloristic evaluation (A 2.3) of the formulation is carried out as described in A 1.2, A 1.3.1 and A 2.1. The results are summarized in Table I.

(b) A formulation is prepared as described under (a), except that 51.5 parts of solvent mixture and 2 parts of the stated compound (c) are employed. The formulation obtained is pourable. The cup flow time is 100 s.

(c) The procedure described under (a) is followed, except that 47.5 parts of solvent mixture and 1 part of sodium di-n-octyl sulfosuccinate are employed. A very fluid formulation is obtained, the cup flow time being 5 s.

(d) The procedure described under (c) is followed, except that 42.5 parts of solvent mixture and 50 parts of Milori blue pigment powder are used. A very fluid formulation, with a cup flow time of 7 s, is obtained.

EXAMPLES 9 TO 24

The procedure followed is similar to Example 8a, except that 5 parts of agent (c) shown in Table II, column 2, are used. Fluid formulations are obtained, the viscosity being characterized in terms of the cup flow time. The results of the coloristic evaluation (A 2.3) of the white reductions obtained according to A 1.2, A 1.3.1, A 1.4.1, A 2.1 and A 2.2 are shown in Table II. The comparative samples were prepared as described in A 1.5, A 1.6.1, A 1.7.1, A 2.1 and A 2.2.

TABLE II

| Example | Agent (c) | Formulation viscosity [s] | Finish 1 White reduction CE | ΔH | ΔC | Finish 2 White reduction CE | ΔH | ΔC |
|---|---|---|---|---|---|---|---|---|
| 9 | naphthalene-OH with -CH₂-N-morpholine | 98 | 89 | −0.6 | +0.4 | 73 | −0.5 | +0.8 |
| 10 | naphthalene with OH, -CH₂-N-morpholine, OH | 12 | 95 | −0.4 | −0.4 | 70 | +0.1 | +1.0 |
| 11 | naphthalene with -CH₂-N(CH₃)₂ | 42 | 87 | 0 | −0.4 | 78 | +0.4 | +0.9 |
| 12 | naphthalene with OH, -CH₂-N(N-methylpiperazine), OH | >100 | 100 | +0.4 | −0.7 | not determined | | |
| 13 | naphthalene-OH with -CH₂-N-piperidine | 17 | 76 | −0.8 | +0.9 | 72 | −0.6 | +0.8 |
| Comparative Example I | | — | 100 | H: 246.1 | C: 32.3 | 100 | H: 244.0 | C: 31.5 |

TABLE II-continued

| Example | Agent (c) | Formulation viscosity [s] | Finish 1 White reduction | | | Finish 2 White reduction | | |
|---|---|---|---|---|---|---|---|---|
| | | | CE | ΔH | ΔC | CE | ΔH | ΔC |
| 14 | 1-(pyrrolidin-1-ylmethyl)-2-naphthol | >100 | 90 | −0.7 | +0.2 | 84 | −0.3 | −0.1 |
| 15 | 1-(phthalimidomethyl)-2-naphthol | >100 | 86 | −0.7 | +0.8 | — | — | — |
| 16 | 1-{[bis(2-methoxyethyl)amino]methyl}-2-naphthol | 11 | 81 | −1.2 | +0.5 | 79 | −0.6 | +0.1 |
| 17 | 1-(piperidin-1-ylmethyl)-2,7-dihydroxynaphthalene | 7 | 95 | −0.1 | −0.6 | 83 | +1.4 | −2.5 |
| 18 | [2-hydroxynaphth-1-yl-CH₂]₂—N—(CH₂)₃—N(CH₃)₂ | 17 | 81 | −1.0 | +0.8 | 76 | −0.7 | +0.4 |
| 19 | [2-hydroxynaphth-1-yl-CH₂]₂—N—(CH₂)₃O(CH₂)₂O—C₄H₉ | 17 | 87 | −0.8 | +0.7 | 78 | −0.6 | +0.5 |

TABLE II-continued

| Example | Agent (c) | Formulation viscosity [s] | Finish 1 White reduction | | | Finish 2 White reduction | | |
|---|---|---|---|---|---|---|---|---|
| | | | CE | ΔH | ΔC | CE | ΔH | ΔC |
| 20 | [naphthol-CH$_2$-N-CH$_2$-CH$_2$OH]$_2$ structure | 6 | 94 | +0.3 | −1.9 | 77 | −0.5 | +0.7 |
| 21 | [naphthol-CH$_2$-N-(CH$_2$)$_3$-N-morpholine]$_2$ structure | >100 | 95 | +0.3 | −1.6 | — | — | — |
| 22 | [[naphthol-CH$_2$-N-CH$_2$-]$_2$ bis-naphthol] structure | >100 | 88 | +0.1 | −1.2 | — | — | — |
| Comparative Sample I | — | — | 100 | H: 246.1 | C: 32.3 | 100 | H: 244.0 | C: 31.5 |
| 23 | [naphthol-CH$_2$-]$_2$ N−(CH$_2$)$_2$−N-piperazine-N−CH$_2$-naphthol structure | 6 | 85 | +0.1 | −1.0 | 73 | −0.7 | +0.9 |

TABLE II-continued

| Example | Agent (c) | Formulation viscosity [s] | Finish 1 White reduction | | | Finish 2 White reduction | | |
|---|---|---|---|---|---|---|---|---|
| | | | CE | ΔH | ΔC | CE | ΔH | ΔC |
| 24 | 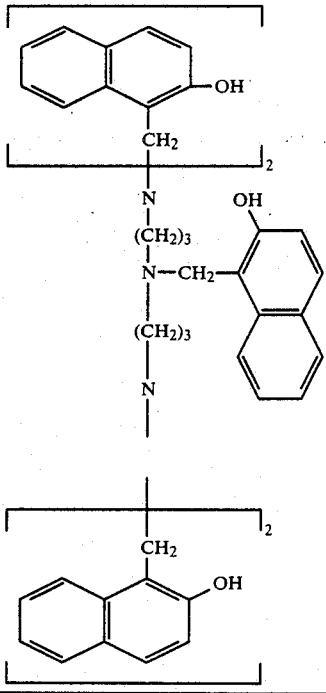 | 5 | 83 | −0.3 | −0.8 | 78 | −0.3 | +0.4 |

EXAMPLES 25 TO 28

A parts of finely divided iron oxide pigment (primary particle size 0.1 μm) are introduced into D parts of a mixture of $C_9$–$C_{19}$-alkylbenzenes and ethylene glycol ethyl ether acetate (70:30) and C parts of the compound

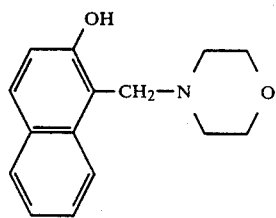

and the mixture is stirred until homogeneous. B parts of dodecylbenzenesulfonic acid are then added, with stirring. A fluid formulation is obtained, which, in both the baking finish and the alkyd finish, gives very deeply colored, pure-hued brilliant white reduction colorings.

The amounts A, B, C and D employed are listed in Table III. Column 6 of the Table shows the viscosities. The results of the coloristic test according to A 2.3 are shown in the right-hand part of the Table. The white reductions were prepared as described in A 1.2, A 1.3.2, A 1.4.2, A 2.1 and A 2.2. The comparative samples III were prepared as described in A 1.5, A 1.6.2, A 1.7.2, A 2.1 and A 2.2.

TABLE III

| Example | Formulation prepared from | | | | Viscosity of formulation [S] | Test results on white reduction | | | | | |
|---|---|---|---|---|---|---|---|---|---|---|---|
| | D | C | A [parts] | B | | Finish 1 | | | Finish 2 | | |
| | | | | | | CE | ΔH | ΔC | CE | ΔH | ΔC |
| 25 | 60 | 5 | 25(1) | 10 | 6 | 83 | −0.6 | 0 | 79 | −0.1 | +1.4 |
| 26 | 50 | 5 | 35(1) | 10 | >100 | 84 | −0.6 | +0.3 | 79 | 0 | +1.6 |
| 27 | 35 | 5 | 50(2) | 10 | 22 | 82 | +1.3 | +1.5 | 88 | +0.2 | +1.2 |
| 28 | 60 | 5 | 25(3) | 10 | 15 | 80 | +0.6 | −0.1 | 84 | +0.3 | +0.5 |
| 29 | 55 | 5 | 30(1) | 10 | 8 | 88 | −0.7 | +0.4 | 81 | −0.1 | +1.6 |
| Comparative Sample III (1) | | | | | — | 100 | 54.3 | 35.3 | 100 | 54.0 | 36.0 |
| Comparative Sample III (2) | | | | | — | 100 | 60.3 | 24.3 | 100 | 63.5 | 27.4 |
| Comparative Sample III (3) | | | | | — | 100 | 75.8 | 39.5 | 100 | 75.8 | 41.2 |

(1) red iron-III oxide pigment
(2) orange iron-III oxide pigment
(3) yellow iron-III oxide pigment

EXAMPLE 29

30 parts of finely divided red iron-III oxide pigment (size of primary particles 0.1 μm) are introduced into 55 parts of a mixture of $C_9$–$C_{19}$-alkylbenzenes and ethylene glycol ethyl ether acetate (70:30) and 5 parts of the compound

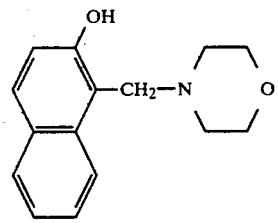

and the mixture is stirred until homogeneous. 10 parts of dodecylbenzensulfonic acid are then added, with stirring. A fluid formulation (cup flow time 8 s) is obtained, which, in both the baking finish and the alkyd finish, gives very deeply colored, pure-hued brilliant white reduction colorings. The coloristic evaluation of the white reductions obtained with the formulation is carried out as described in A 2.3. The white reductions are prepared as described in A 1.2, A 1.3.2, A 1.4.2, A 2.1 and A 2.2, and the comparative samples as described in A 1.5, A 1.6.2, A 1.7.2, A 2.1 and A 2.2. The results are listed in Table III.

EXAMPLES 30 TO 35

The procedure described in Example 29 is followed, except that the compounds shown in Table IV are employed as component (c). Fluid formulations are obtained. The viscosity is characterized in terms of the cup flow time. The coloristic evaluation is carried out as described in A 2.3. The white reduction colorings are prepared as described in A 1.2, A 1.3.2, A 1.4.2 and A 2.2 and the comparative samples as described in A 1.5, A 1.6.2, A 1.7.2, A 2.1 and A 2.2. The results are listed in Table IV.

TABLE IV

| Example. | Agent (c) | Viscosity of formulation [S] | Finish 1 White reduction | | | Finish 2 White reduction | | |
|---|---|---|---|---|---|---|---|---|
| | | | CE | ΔH | ΔC | CE | ΔH | ΔC |
| 30 | 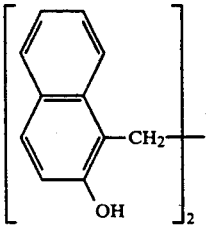 | 6 | 83 | −0.4 | +0.6 | 86 | −0.3 | +1.5 |
| 31 | 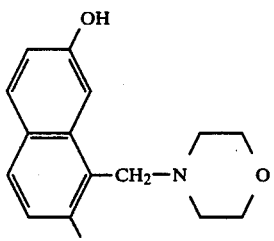 | 7 | 87 | −0.8 | +0.2 | 85 | −0.5 | +1.2 |
| 32 | 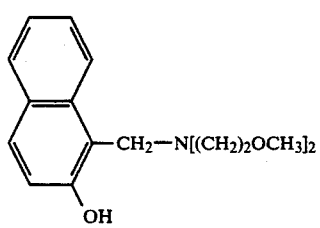 | >100 | 84 | −0.5 | +0.7 | 77 | +0.1 | +1.8 |

TABLE IV-continued

| Example. | Agent (c) | Viscosity of formulation [S] | Finish 1 White reduction | | | Finish 2 White reduction | | |
|---|---|---|---|---|---|---|---|---|
| | | | CE | ΔH | ΔC | CE | ΔH | ΔC |
| 33 | [structure: tris(2-hydroxynaphth-1-ylmethyl) linked via N-(CH₂)₃-N-(CH₂)₃-N] | 6 | 81 | −0.4 | +0.6 | 81 | −0.2 | +1.6 |
| 34 | [structure: bis(2-hydroxynaphth-1-ylmethyl)amine linked via (CH₂)₃ to piperazine-N-CH₂-(2-hydroxynaphth-1-yl)] | 6 | 80 | −0.6 | +0.4 | 83 | −0.2 | +1.6 |
| 35 | [structure: bis[(2-hydroxynaphth-1-yl)CH₂]−N−CH₂CH₂OH] | 6 | 86 | −0.6 | −0.1 | 96 | −0.3 | +1.4 |
| Comparative sample III (1) | | — | 100 | H 54.3 | C 35.3 | 100 | H 54.0 | 36.0 |

We claim:

1. A fluid, stable formulation which contains
   (a) a finely divided pigment based on iron cyano complexes, iron-III oxide or iron-III oxide hydrate,
   (b) one or more $C_6$–$C_{18}$-alkylbenzenesulfonic acids,
   (c) one or more compounds of the formula $$R^3-CH_2-X$$

where
   $R^3$ is 2-hydroxynaphth-1-yl, which may or may not contain 1 or 2 additional β-hydroxyl groups, or is

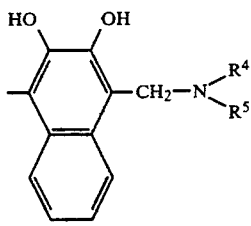

and

X is a radical of the formula

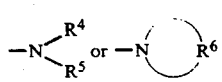

where

R⁴ and R⁵ are each an aliphatic or phenylaliphatic radical, and may be identical or different, or R⁵ is a group of the formula —CH₂—R³ and R⁴ is a group of the formula

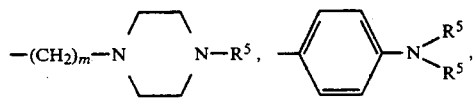

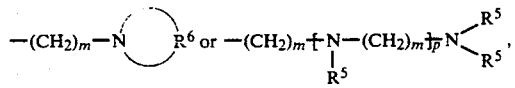

m is 2 or 3,
p is 0, 1 or 2,

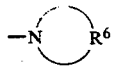

is a saturated or unsaturated 5-membered or 6-membered heterocyclic ring which may or may not contain 1, 2 or 3 ring members from the group comprising

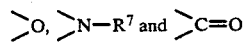

and R⁷ is C₁–C₄-alkyl, and the compound contains from 1 to 6 hydroxynaphthyl groups, and (d) one or more organic liquids, the weight ratio of (b):(c) being from 1:8 to 2:1 and the amount of (c) being from 10 to 20% by weight, based on (a).

2. A formulation as claimed in claim 1, wherein (c) is a compound of the formula

R³—CH₂—X where

R³ is 2-hydroxynaphth-1-yl or 2,7-dihydroxynaphth-1-yl,

X is

R⁵ is —CH₂—R³ and
R⁴ is

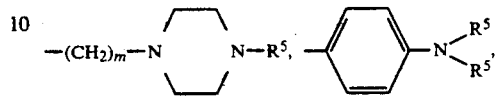

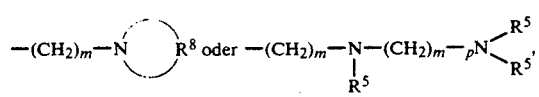

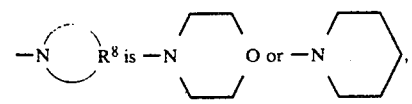

m is 2 or 3 and
p is 0, 1 or 2.

3. A fluid, stable formulation which contains (a) a finely divided pigment based on iron cyano complexes, iron-III oxide or iron-III oxide hydrate, (b) one or more C₆–C₁₈-alkylbenzenesulfonic acids, and (c) one or more compounds of the formula

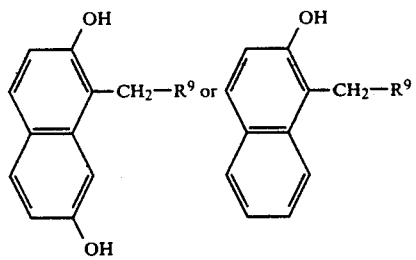

where R⁹ is N-morpholinyl, N-piperidinyl, N-pyrrolidonyl, N-pyrazolyl, N-phthalimido, N-(N'-methylpyrazinyl), N-(N'-ethylpyrazinyl), dimethylamino, diethylamino, dipropylamino, dibutylamino, di-(2-methoxyethyl)-amino, di-(2-ethoxyethyl)-amino, di-(2-propoxyethyl)-amino, di-(2-butoxyethyl)-amino, di-(3-methoxypropyl)-amino, di-(3-ethoxypropyl)-amino, di-(3-butoxypropyl)-amino, di-(2-hydroxyethylamino) or dibenzylamino.

4. A formulation as claimed in claim 1, which contains from 20 to 55% by weight of (a), from 1 to 12% by weight of (b), from 2 to 8% by weight of (c) and from 77 to 30% by weight of (d), the percentages being based on (a+b+c+d).

5. A formulation as claimed in claim 2, which contains from 20 to 55% by weight of (a), from 1 to 12% by weight of (b), from 2 to 8% by weight of (c) and from 77 to 30% by weight of (d), the percentages being based on (a+b+c+d).

6. A formulation as claimed in claim 3, which contains from 20 to 55% by weight of (a), from 1 to 12% by weight of (b), from 2 to 8% by weight of (c) and from 77 to 30% by weight of (d), the percentages being based on (a+b+c+d).

7. A formulation as claimed in claim 1, which additionally contains (e) which is a sedimentation-reducing or sedimentation-preventing agent.

8. A formulation as claimed in claim 7, wherein (e) is an alkali metal salt or ammonium salt of a di-$C_4$-$C_{18}$-alkyl sulfosuccinate, and its amount is from 0.1 to 3% by weight, based on (a).

9. A formulation as claimed in claim 7, wherein (e) is an alkali metal salt or amine salt or dioctyl sulfosuccinate and its amount is from 0.3 to 2% by weight.

10. A formulation as claimed in claim 3, which additionally contains (e) which is an alkali metal salt or ammonium salt of a di-$C_4$-$C_{18}$-alkyl sulfosuccinate, and its amount is from 0.1 to 3% by weight, based on (a).

11. A formulation as claimed in claim 1, wherein $R^4$ and $R^5$ independently of one another are $C_1$-$C_5$-alkyl, $C_1$-$C_8$-alkoxy-$C_2$— or $C_3$-alkyl, alkoxy-alkoxy-$C_2$— or $C_3$-alkyl, where alkoxy-alkoxy is of 3 to 11 carbon atoms, hydroxy-$C_2$— or $C_3$-alkyl, N,N-di-$C_1$-$C_4$-alkylamino-$C_2$— or $C_3$-alkyl, phen-$C_1$-$C_4$-alkyl,

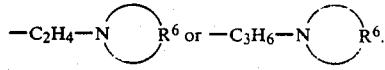

12. A formulation as claimed in claim 11, wherein (c) is a compound of the formula $R^3$—$CH_2$—X where
$R^3$ is 2-hydroxynaphth-1-yl or 2,7-dihydroxynaphth-1-yl,
X is

$R^5$ is —$CH_2$—$R^3$ and
$R^4$ is

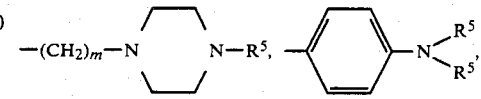

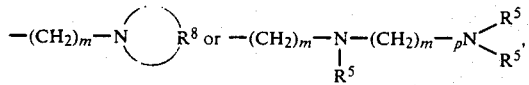

m is 2 or 3 and
p is 0, 1 or 2.

13. A formulation as claimed in claim 2, which additionally contains (e) which is a sedimentation-reducing or sedimentation-preventing agent.

14. A formulation as claimed in claim 13, wherein (e) is an alkali metal salt or ammonium salt of a di-$C_4$-$C_{18}$-alkyl sulfosuccinate, and its amount is from 0.1 to 3% by weight, based on (a).

15. A formulation as claimed in claim 13, wherein (e) is an alkali metal salt or amine salt of dioctyl sulfosuccinate and its amount is from 0.3 to 2% by weight.

* * * * *